US009459913B2

(12) United States Patent
Manjunath et al.

(10) Patent No.: US 9,459,913 B2
(45) Date of Patent: Oct. 4, 2016

(54) SYSTEM AND METHOD FOR PROVIDING PRINT READY CONTENT TO A PRINTING DEVICE

(75) Inventors: Geetha Manjunath, Bangalore (IN); Thara Subramoni, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 1019 days.

(21) Appl. No.: 13/157,313

(22) Filed: Jun. 10, 2011

(65) Prior Publication Data

US 2012/0271960 A1 Oct. 25, 2012

(30) Foreign Application Priority Data

Apr. 25, 2011 (IN) .......................... 1402/CHE/2011

(51) Int. Cl.
*G06F 15/16* (2006.01)
*G06F 9/48* (2006.01)

(52) U.S. Cl.
CPC .................................. *G06F 9/4843* (2013.01)

(58) Field of Classification Search
CPC ...................... G06F 17/30887; G06F 9/4843
USPC ....................................................... 709/229
See application file for complete search history.

(56) References Cited

U.S. PATENT DOCUMENTS

| 6,654,741 | B1 * | 11/2003 | Cohen ............... G06F 17/30887 |
| 7,386,614 | B2 * | 6/2008 | Barritz ............. G06F 17/30887 |
| | | | 707/999.1 |
| 2003/0103226 | A1 * | 6/2003 | Nishio ........................ 358/1.13 |
| 2003/0154289 | A1 * | 8/2003 | Williamson et al. ......... 709/227 |
| 2004/0020389 | A1 * | 2/2004 | Holmstead et al. .......... 101/484 |
| 2004/0021905 | A1 * | 2/2004 | Holmstead et al. ......... 358/1.16 |
| 2004/0174561 | A1 * | 9/2004 | Fukunaga et al. ........... 358/1.15 |
| 2005/0088684 | A1 * | 4/2005 | Naito et al. .................. 358/1.15 |
| 2005/0091536 | A1 * | 4/2005 | Whitmer et al. ............. 713/201 |
| 2006/0143684 | A1 * | 6/2006 | Morris ......................... 725/138 |
| 2007/0050844 | A1 * | 3/2007 | Lebel ............................. 726/13 |
| 2007/0159504 | A1 | 7/2007 | Lin et al. |
| 2008/0120257 | A1 * | 5/2008 | Goyal et al. .................... 706/12 |
| 2009/0083251 | A1 * | 3/2009 | Sahasrabudhe et al. ......... 707/5 |

\* cited by examiner

*Primary Examiner* — Tauqir Hussain
(74) *Attorney, Agent, or Firm* — HP Inc Patent Department

(57) ABSTRACT

A script file is maintained on a server system. The script file captures semantics of a task previously performed by a user on a web browser. The server system executes the script file to reproduce the task in response to a request for print ready content where the request is associated with performing the task. The server system converts content obtained from reproducing the task into print ready content and provides the print ready content via a network connection to a printing device.

20 Claims, 3 Drawing Sheets

SYSTEM AND METHOD FOR PROVIDING PRINT READY CONTENT TO A PRINTING DEVICE

RELATED APPLICATION

Benefit is claimed under 35 U.S.C. 119(a)-(d) to Foreign application Serial No. 1402/CHE/2011, filed in INDIA entitled "SYSTEM AND METHOD FOR PROVIDING PRINT READY CONTENT TO A PRINTING DEVICE" by Hewlett-Packard Development Company, L.P., filed on Apr. 25, 2011, which is herein incorporated in its entirety by reference for all purposes.

BACKGROUND

With the growth of Internet content and services, Internet applications are becoming increasingly popular. Application software, commonly referred to as an application or simply "app," is designed to allow a user to perform a singular or multiple related specific tasks. Such "apps" are designed for a variety of web-connected devices, including mobile devices, desktop computers, notebooks, and the like.

BRIEF DESCRIPTION OF DRAWINGS

The following description includes discussion of figures having illustrations given by way of example of implementations of embodiments of the invention. The drawings should be understood by way of example, not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

DETAILED DESCRIPTION

As mentioned above, Internet applications or "apps" may be designed for a variety of web-connected devices. In particular, embodiments described herein facilitate the creation of new apps, including apps for printing. An Internet application designed for printing is referred to herein as a "print app." As described herein, print apps and other apps may be end-user created without programming (e.g., Java programming) by simply performing browser actions on a web browser.

Creation of a print app involves a user performing the web interaction for a task of interest. The user actions are recorded and analyzed along with the web pages on which the actions were performed to capture the semantics of the user's actions in the form of a script. The script is registered with a repository and assigned a unique URI (Uniform Resource Identifier) with which the task can be repeated. Access to the task URI triggers an execution engine to perform the sequence of web actions as dictated by the task (possibly with new parameters). When the task is triggered in conjunction with an invocation of a print app, the results of the web task are converted into print ready content (i.e., in a format that a printer can handle) and sent (e.g., via network connection) to a web-connected printer.

Figure 1:
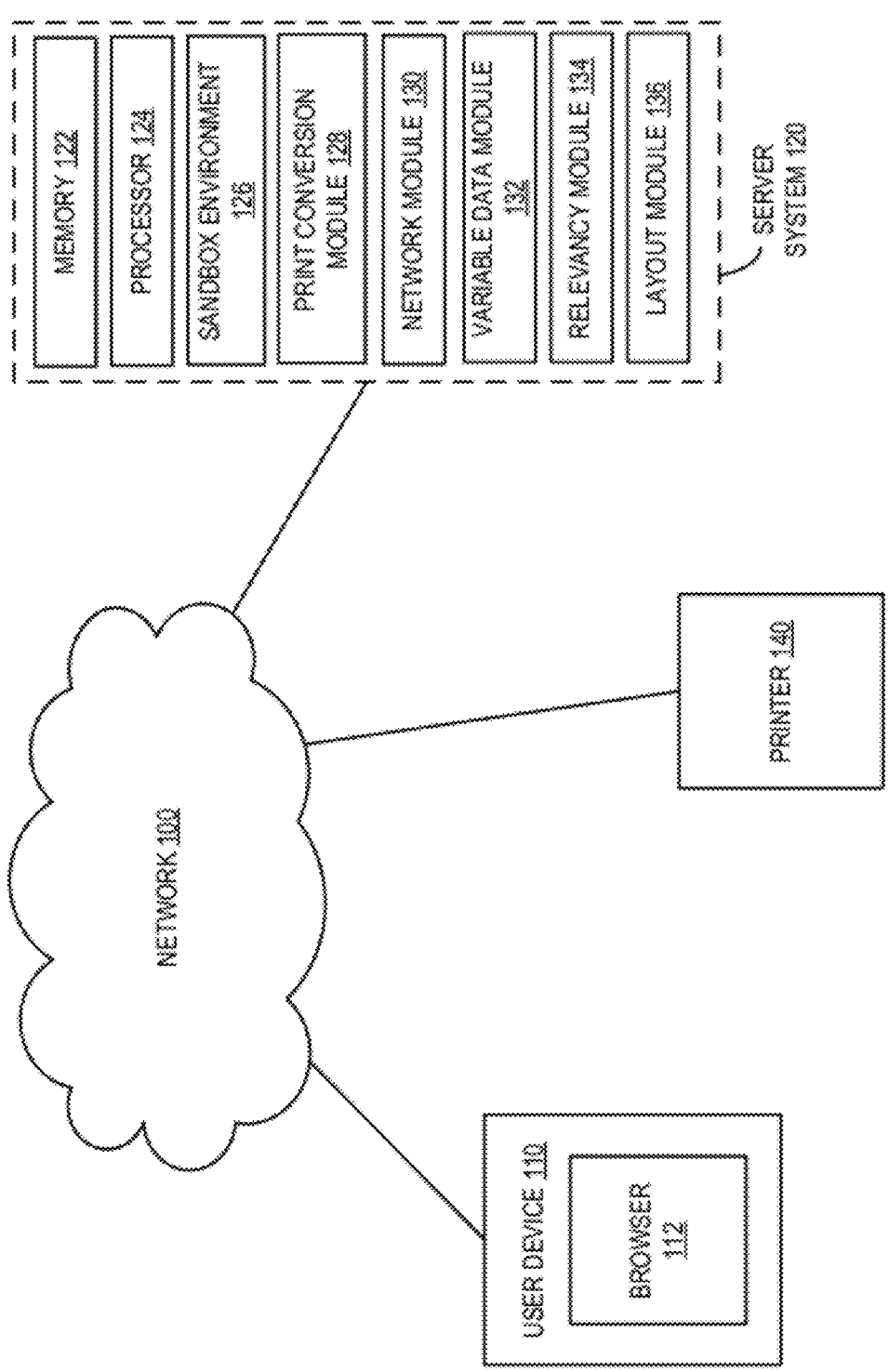
FIG. 1 is a block diagram illustrating a system according to various embodiments.

FIG. 1 is a block diagram illustrating a system according to various embodiments. FIG. 1 includes particular components, modules, etc. according to various embodiments. However, in different embodiments, more, fewer, and/or other components, modules, arrangements of components/modules, etc. may be used according to the teachings described herein. In addition, various components, modules, etc. described herein may be implemented as one or more software modules, hardware modules, special-purpose hardware (e.g., application specific hardware, application specific integrated circuits (ASICs), embedded controllers, hardwired circuitry, etc.), or some combination of these.

User device 110, server system 120, and printer 140 are connected to network 100 (e.g., the Internet). User device can be any computing device capable of executing a web browser. Such devices include, but are not limited to, desktop computer, notebooks, mobile devices, tablets, smart phones and other smart devices.

In various embodiments, when a user desires to create a new app, the user performs a task (e.g., a series of actions) on web browser 112. An app authoring tool (e.g., a browser plug-in) records and analyzes (e.g., upon user request) the user actions along with the web pages on which the actions were performed to capture the semantics of the user actions in the form of a script. In various embodiments, this script is created using a scripting language called TTL (Tasklet Template Language), which is a web interaction language developed by the Hewlett-Packard Company of Palo Alto, Calif., though other suitable scripting languages could be used.

The generated script is sent over network 100 to server system 120 where it is stored in memory 122. A unique URI (Uniform Resource Identifier) is allocated for accessing the script in memory 122. Access to the URI triggers processor 124 to execute the script in sandbox environment 126. Execution of the script causes the task to be reproduced. For example, the task might involve creating a custom document by navigating to various web pages and extracting interesting fragments of the different web pages while entering certain parameters along the way. Thus, the script generated from recording the user's actions (e.g., clicks, keystrokes, etc.) while creating the custom document allows the task of creating the custom document to be repeated upon execution of the script. In other words, each execution of the script causes the content resulting from the task to be generated anew. In some embodiments, execution of the script may require variable user input (e.g., entering a name or address into a form, etc.). Variable data module 132 triggers a request for variable user input to the user when such input is needed. Upon receiving variable input from the user, variable data module 132 incorporates the variable input into the execution of the script.

Print conversion module 126 converts the content acquired as a result of executing the script into a print ready format. As used herein, a print ready format is a format in which a printer can receive and print data. Relevancy module 134 determines the relevancy of content fragments acquired as a result of executing the script. In determining relevancy, some acquired content may be discarded. In some embodiments, relevancy is determined automatically based on intelligent algorithms. In other embodiments, relevancy is determined in response to user input. Based on the relevancy of various content fragments, layout module 136 determines a print layout for the content fragments (collectively, the "content"). Once the content has been converted into print ready format and a print layout has been generated, network interface module 130 transmits the acquired content in print ready format to printer 140.

Various modules and/or components illustrated in FIG. 1 may be implemented as a non-transitory computer-readable storage medium containing instructions executed by a processor (e.g., processor 124) and stored in a memory (e.g., memory 122).

Figure 2:
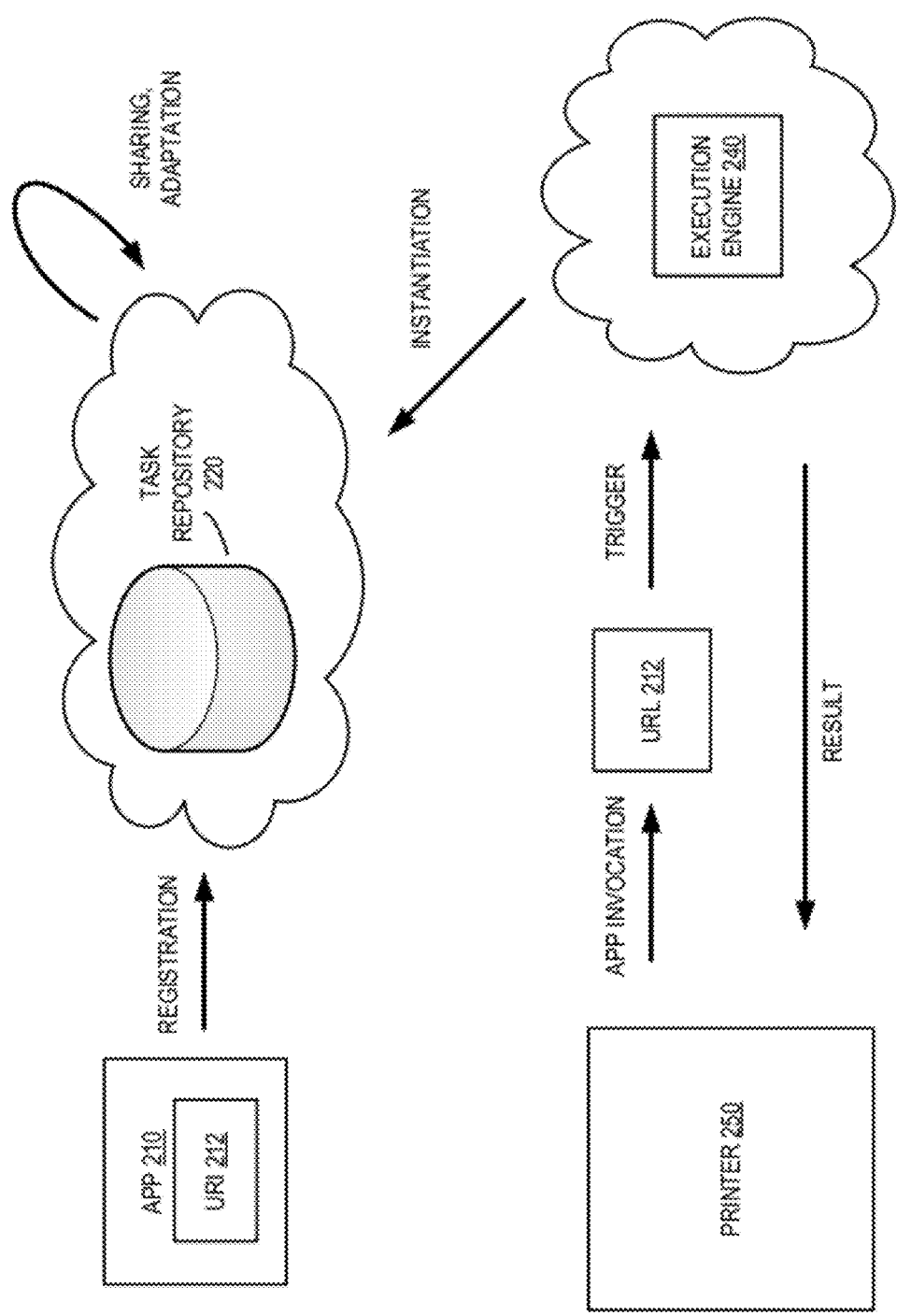
FIG. 2 is a block diagram illustrating a system according to various embodiments.

The life cycle of an app is illustrated in FIG. 2. FIG. 2 includes particular components, modules, etc. according to various embodiments. However, in different embodiments, more, fewer, and/or other components, modules, arrangements of components/modules, etc. may be used according to the teachings described herein. In addition, various components, modules, etc. described herein may be implemented as one or more software modules, hardware modules, special-purpose hardware (e.g., application specific hardware, application specific integrated circuits (ASICs), embedded controllers, hardwired circuitry, etc.), or some combination of these.

While the examples described herein specifically address print apps, other embodiments could similarly be employed to create apps not related to printing. App 210 is created by recording user actions on a web browser. An authoring tool (e.g., in the form of a web browser plug-in) on the user's web browser records user actions when triggered, for example, by the user. This set of actions is referred to collectively as "the task." The user action may include variable data entry. For example, a user might navigate to a web site to provide various inputs (e.g., answer questions, fill in blanks, etc.), perhaps on different web pages. After providing input (e.g., by selecting from drop down menus, entering text into text fields, etc.), the web site might generate an output (e.g., document, form, report, image, etc.) that incorporates the user's input. Assuming the user triggers the authoring tool (e.g., by clicking or selecting a "record" button or similar mechanism) prior to navigating to the web site and performing the task, the task is recorded by the authoring tool. The authoring tool analyzes the user actions of the task along with the structure and semantics of the web pages accessed in conjunction with the user actions. Based on the analysis, a script is generated that captures the semantics of the task. The script may be generated using a scripting language such as TTL or other suitable scripting language.

The script is registered with a task repository 220 and assigned a unique URI 212 with which the task may be repeated. App 210 may be downloaded and installed onto a web-connected device, such as web-connected printer 250, a mobile device that can be used to trigger a print activity, or other suitable device. Also, once the task is in task repository 220, it may be shared (subject to any defined privacy or security settings) with other users having access to task repository 220. Furthermore, tasks in task repository 220 can be leveraged and adapted to create new print apps with modified tasks. For example, tasks from multiple print apps could be combined into one new app. In another example, fixed user inputs associated with a user-created app could be modified and saved as a new app.

When a user invokes app 210 on printer 250 (or a mobile device which is printer capable), it triggers an instantiation of URI 212 by execution engine 240. Execution engine 240 may reside on a server device or be part of a collection of server devices operating as a server system (e.g., a cloud computing infrastructure). Execution engine 240 retrieves the script file for the task associated with URI 212 and causes the task to be executed. In embodiments where the task requires variable user input, execution engine 240 may solicit such input from the user. For example, the task might involve accessing and filling out a form where the variable user input required includes personal information such as name and address. By collecting this variable user input, execution engine 240 may provide this information to the relevant web page(s) as part of executing the script associated with the task. Ultimately, execution of the script produces one or more content results. Execution engine 240 transforms the results of reproducing the task into a print ready form for printing by printer 250 using one or more print APIs (application program interfaces) available for the web-connected printer.

Various modules and/or components illustrated in FIG. 2 may be implemented as a non-transitory computer-readable storage medium containing instructions executed by a processor and stored in a memory.

Figure 3:
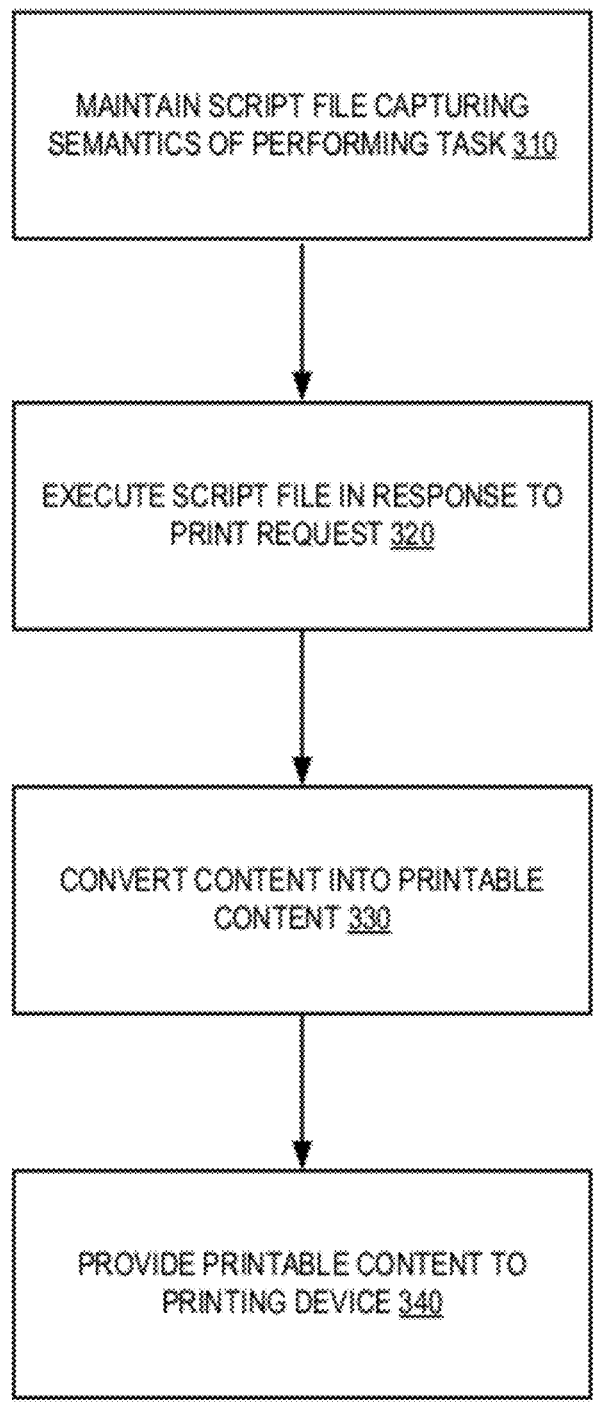
FIG. 3 is a flow diagram of operation in a system according to various embodiments.

FIG. 3 is a flow diagram of operation in a system according to various embodiments. FIG. 3 includes particular operations and execution order according to certain embodiments. However, in different embodiments, other operations, omitting one or more of the depicted operations, and/or proceeding in other orders of execution may also be used according to teachings described herein.

A server system maintains 310 a script file that captures the semantics of a task previously performed by a user on a web browser. The script file is generated by a browser plug-in or other suitable authoring tool using a scripting language (e.g., TTL). As part of maintaining the script file, a unique URI (Uniform Resource Identifier) might be associated with the script file so that it may be accessed by a web-connected device. When the server system receives a request for print ready content associated with the task (e.g., via a user accessing the unique URI), the server system executes 320 the script file to reproduce the task. Content (e.g., web page content) obtained from reproducing the task is converted 330 into print ready content. For example, HTML (Hypertext Markup Language) content may be converted to a PDF (Portable Document Format) or other format that can be handled by a printer. This conversion to PDF may include manually directed steps to select a preference for the print layout. The conversion may also be automated such that intelligent algorithms reformat and layout the content in a print-friendly layout.

The server system provides 340 the converted print ready content to a printing device via a network connection. In various embodiments, a print command is sent to the printing device in connection with the print ready content. The specific printing device that receives the print ready content and/or print command may be specified implicitly or explicitly in the original request for print ready content. For example, a user may send a print request from a web-connected printing device by accessing a print app on the print device. In such cases, the print request implicitly identifies the requesting printing device as the printing device to receive the print ready content. In a different example, a user might access a print app from a web browser on a non-printing device (e.g., desktop, notebook, smartphone, tablet, etc.). If the user has only a single printer registered to a user account or associated with the accessing device, the print request might implicitly identify that singular printer as being the target printer for the request. However, if a user has multiple printer associations, the server system might receive the request and automatically determine the appropriate printing device to receive the print ready content (e.g., using factors such as location, printer availability, etc.) or the user might explicitly select a particular printing device as part of the request.

Various modifications may be made to the disclosed embodiments and implementations of the invention without departing from their scope. Therefore, the illustrations and examples herein should be construed in an illustrative, and not a restrictive sense.

The invention claimed is:

1. A method for providing print ready content to a printing device, comprising:
 a server system providing a uniform resource identifier (URI) to a client device, the URI to be associated with a client-generated script file that captures semantics of a task as performed by a client user via a browser;
 the server system maintaining the script file and the associated URI, which were both received from the client;
 the server system accessing the URI, which triggers executing the script file to reproduce the task in response to a request for print ready content associated with performing the task;
 the server system converting content obtained from reproducing the task into print ready content; and
 the server system providing the print ready content via a network connection to a printing device.

2. The method of claim 1, wherein the content obtained from reproducing the task is owned by a content owner, and wherein the server system maintains the script file in connection with verifying authorization from the content owner to convert the content to print ready content and provide the print ready content to the printing device.

3. The method of claim 1, wherein executing the script file further comprises:
 executing the script file in a sandbox environment.

4. The method of claim 1, further comprising:
 the server system generating the URI for the script file;
 providing, via network connection, the generated URI to a web-connected widget on the client;
 wherein receiving the request for print ready content comprises receiving an invocation of the web-connected widget from the client; and
 wherein accessing the URI comprises triggering an instantiation of the URI in response to receiving the invocation of the web-connected widget.

5. The method of claim 1, wherein executing the script file comprises:
 the server system requesting and receiving, during execution of the script file, variable input from the client user; and
 incorporating the variable input into the execution of the script file to reproduce the task.

6. The method of claim 1, further comprising:
 providing a browser plugin to the browser to record user actions associated with performing the task, to analyze the recorded actions and the structure and semantics of one or more web pages accessed in conjunction with the user actions, and to automatically generate the script file based on the user actions and the one or more accessed web pages.

7. The method of claim 1, further comprising:
 downloading a copy of the script file from the server system to a web-connected printer; and
 receiving the request for print ready content from the web-connected printer.

8. A non-transitory computer-readable storage medium containing instructions that, when executed, cause a computer to:
 from a client, receive and store a client-generated script file capturing semantics of a web task that was recorded and analyzed within a web browser on the client, the script file received together with an identifying universal resource identifier (URI);
 execute the script file to reproduce the task in response to the URI being accessed via a request for print ready content associated with the task;
 convert content obtained from reproducing the task into print ready content; and
 provide the print ready content via a network connection to a printing device.

9. The non-transitory computer-readable storage medium of claim 8, wherein the content obtained from the reproducing the task is owned by a content owner, and wherein the instructions that cause the computer to store the script file comprise further instructions that cause the computer to store the script file in connection with a verification that converting the content to print ready content and providing the print ready content to the printing device is authorized by the content owner.

10. The non-transitory computer-readable storage medium of claim 9, comprising further instructions that cause the computer to:
 compare a credential included with the script file to a credential on a website from where the content is obtained to verify authorized use of the content.

11. The non-transitory computer-readable storage medium of claim 8, wherein the instructions that cause the computer to execute the script file comprise further instructions that cause the computer to:
 execute the script file in a sandbox environment.

12. The non-transitory computer-readable storage medium of claim 8, comprising further instructions that cause the computer to:
 send, via network connection, the URI to a web-connected widget on the client; and
 wherein receiving the request for print ready content comprises receiving an invocation of the web-connected widget.

13. The non-transitory computer-readable storage medium of claim 8, comprising further instructions that cause the computer to:
 receive, during execution of the script file, textual input provided by a user in response to a request for input from the computer; and
 incorporate the textual input into the execution of the script file to reproduce the task.

14. A system for providing print content to a printing device over a network, the system comprising:
 a memory to store a client-generated script file that captures semantics of a series of user actions performed on a web browser, the script file to be received from the client together with a universal resource identifier (URI), which is generated by the system and used to access the script file stored in the memory;
 a sandbox environment to execute the script file in connection with a received request for print ready content;
 a print conversion module to render content into a print ready format, the content comprising one or more content fragments newly acquired from at least one remote web site as a result of executing the script file;
 a network module to transmit the content in print ready format to a web-connected printing device.

15. The system of claim 14, further comprising: a variable data module to, during execution of the script file, request variable input from a user and incorporate the variable input received in response to the request into the execution of the script file.

16. The system of claim 14, further comprising:
   a relevancy module to determine relevancy of the one or more content fragments and to discard acquired content fragments, if any, determined to be not relevant; and
   a layout module to determine a print layout for the content based on the relevancy of the one or more content fragments.

17. The system of claim 16, the relevancy module to determine relevancy of content fragments automatically.

18. The system of claim 17, the relevancy module to determine relevancy of content fragments in view of user input.

19. The method of claim 1 further comprising:
   allowing the script file maintained by the server system to be shared with one or more users of various different clients.

20. The method of claim 1 further comprising:
   adapting the script file maintained by the server system to create a new script file for a modified task.

\* \* \* \* \*